(12) United States Patent
Alexander et al.

(10) Patent No.: US 8,631,652 B2
(45) Date of Patent: Jan. 21, 2014

(54) HEAT ENGINE SYSTEM

(75) Inventors: Paul W. Alexander, Ypsilanti, MI (US); Alan L. Browne, Grosse Pointe, MI (US); Nancy L. Johnson, Northville, MI (US); Patrick B. Usoro, Troy, MI (US); Nilesh D. Mankame, Ann Arbor, MI (US); Xiujie Gao, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 474 days.

(21) Appl. No.: 12/947,917

(22) Filed: Nov. 17, 2010

(65) Prior Publication Data

US 2011/0120116 A1      May 26, 2011

Related U.S. Application Data

(60) Provisional application No. 61/263,180, filed on Nov. 20, 2009.

(51) Int. Cl.
*F01B 29/10* (2006.01)

(52) U.S. Cl.
USPC .......................................................... 60/527

(58) Field of Classification Search
USPC .................................... 60/527–529
See application file for complete search history.

(56) References Cited

U.S. PATENT DOCUMENTS

| | | | | |
|---|---|---|---|---|
| 3,665,705 A | * | 5/1972 | Christensen | 60/527 |
| 3,830,060 A | * | 8/1974 | Jedlicka et al. | 60/527 |
| 4,041,706 A | * | 8/1977 | White | 60/527 |
| 4,055,955 A | | 11/1977 | Johnson | |
| 4,087,971 A | * | 5/1978 | Hart | 60/527 |
| 4,150,544 A | | 4/1979 | Pachter | |
| 4,275,561 A | * | 6/1981 | Wang | 60/527 |
| 4,325,217 A | * | 4/1982 | Golestaneh | 60/527 |
| 4,423,596 A | * | 1/1984 | Karnes et al. | 60/527 |
| 4,450,686 A | * | 5/1984 | Banks | 60/527 |
| 5,327,987 A | | 7/1994 | Abdelmalek | |
| 6,226,992 B1 | * | 5/2001 | Kutlucinar et al. | 60/528 |
| 7,775,042 B1 | * | 8/2010 | Tice | 60/529 |
| 2005/0178120 A1 | * | 8/2005 | Kutlucinar | 60/528 |
| 2009/0241537 A1 | * | 10/2009 | Browne et al. | 60/527 |
| 2011/0120117 A1 | * | 5/2011 | Alexander et al. | 60/527 |
| 2012/0216525 A1 | * | 8/2012 | Browne et al. | 60/528 |
| 2013/0118172 A1 | * | 5/2013 | Tice | 60/671 |

FOREIGN PATENT DOCUMENTS

| | | | |
|---|---|---|---|
| JP | 57079268 A | * | 5/1982 |
| JP | 6080031 A | | 3/1994 |
| JP | 2003232276 A | | 8/2003 |

OTHER PUBLICATIONS

Translation of JP 57079268 A (Attached).*

* cited by examiner

*Primary Examiner* — Thomas Denion
*Assistant Examiner* — Jessica Kebea
(74) *Attorney, Agent, or Firm* — Quinn Law Group, PLLC (57) ABSTRACT

A heat engine system configured for converting thermal energy to mechanical energy includes a source of thermal energy provided by a temperature difference between a heat source having a first temperature and a heat sink having a second temperature that is lower than the first temperature. The heat engine is configured for converting thermal energy to mechanical energy and includes an element formed from a first shape memory alloy having a crystallographic phase changeable between austenite and martensite at a first transformation temperature in response to the temperature difference between the heat source and the heat sink. The heat engine system also includes a start-up mechanism configured for inducing initial movement of the element in a desired operational direction to thereby start the heat engine.

7 Claims, 6 Drawing Sheets

HEAT ENGINE SYSTEM

CROSS-REFERENCE TO RELATED APPLICATIONS

This application claims the benefit of U.S. Provisional Patent Application No. 61/263,180, filed Nov. 20, 2009, which is hereby incorporated by reference in its entirety.

TECHNICAL FIELD

The present disclosure generally relates to a heat engine system, and more specifically, to a heat engine system configured for converting thermal energy to mechanical energy.

BACKGROUND

Thermal energy is a form of energy provided by a temperature difference between objects, regions, and/or fluids. For example, a primary region of a system may have a comparatively higher temperature than that of a secondary region of a system, and the temperature difference may provide a source of thermal energy. Further, such thermal energy may be converted to another form of energy, e.g., mechanical energy or electricity.

SUMMARY

A heat engine system configured for converting thermal energy to mechanical energy includes a source of thermal energy and a heat engine configured for converting thermal energy to mechanical energy. The source of thermal energy is provided by a temperature difference between a heat source having a first temperature and a heat sink having a second temperature that is lower than the first temperature. The heat engine is disposed in thermal relationship with the heat sink and includes an element formed from a first shape memory alloy having a crystallographic phase changeable between austenite and martensite at a first transformation temperature in response to the temperature difference between the heat source and the heat sink. Further, the heat engine system includes a start-up mechanism configured for inducing initial movement of the element in a desired operational direction to thereby start the heat engine.

In one variation, the element is configured in a continuous loop. The first shape memory alloy has a crystallographic phase changeable from martensite to austenite at the first transformation temperature to thereby dimensionally contract at a localized region in response to the heat source, and from austenite to martensite at the first transformation temperature to thereby dimensionally expand at another localized region in response to the heat sink. In addition, the start-up mechanism includes an isolator configured for isolating the element from the heat source.

In another variation, the heat engine includes the element configured in the continuous loop and a plurality of pulleys configured for supporting the element, whereby the continuous loop translates along the plurality of pulleys. The start-up mechanism is configured for inducing initial movement of the element in the desired operational direction to thereby translate the element along the plurality of pulleys and start the heat engine.

The heat engine system efficiently converts thermal energy to mechanical energy. That is, the heat engine system efficiently harvests thermal energy and produces mechanical output. Further, the heat engine may be started after a period of non-use or after a temporary stall. In particular, the heat engine includes kick-start functionality to induce initial movement of the element during start-up of the heat engine.

The above features and advantages and other features and advantages of the present disclosure are readily apparent from the following detailed description of the best modes for carrying out the disclosure when taken in connection with the accompanying drawings.

DETAILED DESCRIPTION

Figure 1:
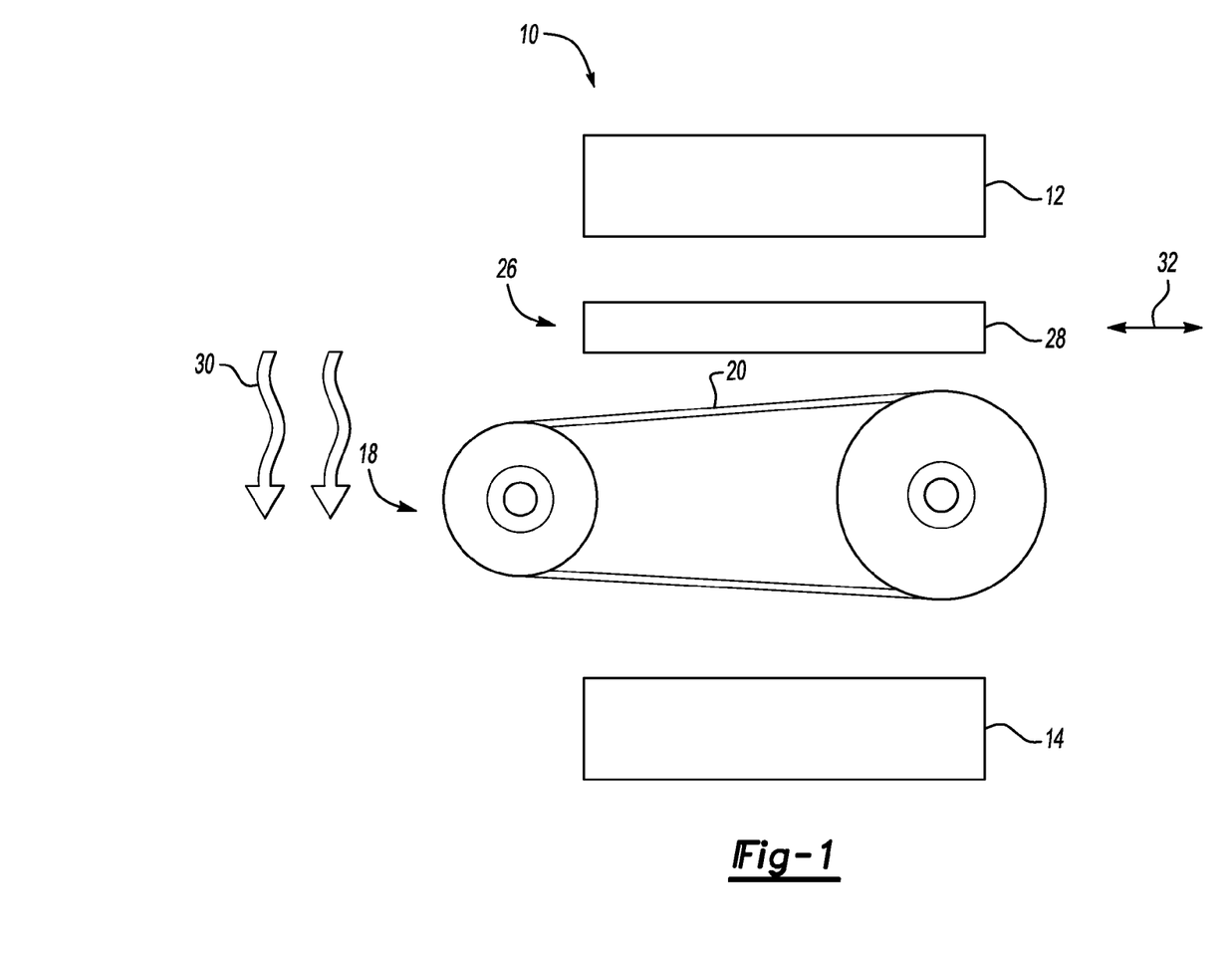
FIG. 1 is a schematic diagram of a heat engine system including a source of thermal energy, a heat engine configured for converting thermal energy to mechanical energy, and a start-up mechanism for the heat engine.

Referring to the Figures, wherein like reference numerals refer to like elements, a heat engine system is shown generally at 10 in FIG. 1. The heat engine system 10 is configured for converting thermal energy to mechanical energy. Therefore, the heat engine system 10 may be useful for automotive applications including, but not limited to, engine cooling systems, vehicle exhaust systems, powertrain systems, and electrical systems. However, the heat engine system 10 may also be useful for non-automotive applications, such as, but not limited to, household heating, ventilating, and air conditioning systems.

Referring now to FIG. 1, the heat engine system 10 includes a source of thermal energy. The source of thermal energy is provided by a temperature difference, $\Delta T$, between a heat source 12 having a first temperature, $T_1$, and a heat sink 14 having a second temperature, $T_2$, that is lower than the first temperature, $T_1$. That is, the first temperature, $T_1$, is higher and different than the second temperature, $T_2$. For example, the temperature difference, $\Delta T$, between the first temperature, $T_1$, and the second temperature, $T_2$, may be as little as about 5° C. and no more than about 100° C. Stated differently, the temperature difference, $\Delta T$, may be greater than or equal to about 5° C. and less than or equal to about 30° C., e.g., less than or equal to about 10° C. As non-limiting examples, although not shown, the temperature difference, $\Delta T$, may exist between or within catalytic converters, battery compartments, transmissions, wheels, brakes, shock absorbers, radiators, heat exchangers, mufflers, turbo/super chargers, plug-in units, and vehicle exteriors. That is, the temperature difference, $\Delta T$, may exist between or within engine lubrication systems, engine coolant systems, battery cooling systems, and the like.

The heat source 12 and the heat sink 14 may each be selected from the group of gases, liquids, solids, and combinations thereof. For example, at least one of the heat source 12 and the heat sink 14 may be a gas, such as a portion of exhaust emissions of the vehicle (not shown) or ambient air in an environment external to the vehicle. Moreover, the heat source 12 may have a different form or phase than the heat sink 14. For example, the heat source 12 may be a gas and the heat sink 14 may be a liquid. Further, the heat source 12 may be the same composition as the heat sink 14, or may be a different composition than the heat sink 14. In one variation, the heat source 12 and the heat sink 14 may each be exhaust gas from a vehicle, but the exhaust gas of the heat source 12 may have the first temperature, $T_1$, that is higher than the second temperature, $T_2$, of the exhaust gas of the heat sink 14. That is, as set forth above, the exhaust gas of the heat sink 14 may be cooler than the exhaust gas of the heat source 12. Or, the heat sink 16 may be an ambient environment external to the vehicle (not shown), such as a relatively cool air flow over the vehicle during vehicle travel.

In another variation described with reference to FIG. 2, at least one of the heat source 12 and the heat sink 14 may be a solid, such as a conduit of exhaust gas, piping, rollers, idle pulleys 56, 58 (FIG. 2), and/or other solid vehicle components, for example. In this variation, the heat source 12 and/or the heat sink 14 may also include a plurality of contacting objects 16 that are configured for conducting heat from the heat source 12 and/or to the heat sink 14, as set forth in more detail below.

Referring again to FIGS. 1 and 2, the heat engine system 10 also includes a heat engine 18. The heat engine 18 is configured for converting thermal energy, e.g., heat, to mechanical energy, as set forth in more detail below. More specifically, the heat engine 18 includes an element 20 (FIG. 2) formed from a first shape memory alloy having a crystallographic phase changeable between austenite and martensite at a first transformation temperature, $T_{trans1}$, in response to the temperature difference, $\Delta T$, between the heat source 12 and the heat sink 14. That is, the first shape memory alloy may have a specific transformation temperature, $T_{trans1}$, at which the first shape memory alloy transitions between crystallographic phases.

As used herein, the terminology "shape memory alloy" refers to alloys that exhibit a shape memory effect and have the capability to quickly change properties in terms of stiffness, spring rate, and/or form stability. That is, the first shape memory alloy may undergo a solid state crystallographic phase change via molecular or crystalline rearrangement to shift between a martensite phase, i.e., "martensite", and an austenite phase, i.e., "austenite". Stated differently, the first shape memory alloy may undergo a displacive transformation rather than a diffusional transformation to shift between martensite and austenite. A displacive transformation is defined as a structural change that occurs by the coordinated movement of atoms or groups of atoms relative to neighboring atoms or groups of atoms. In general, the martensite phase refers to the comparatively lower-temperature phase and is often more deformable than the comparatively higher-temperature austenite phase.

The temperature at which the first shape memory alloy begins to change from the austenite phase to the martensite phase is known as the martensite start temperature, $M_s$. The temperature at which the first shape memory alloy completes the change from the austenite phase to the martensite phase is known as the martensite finish temperature, $M_f$, or first transformation temperature, $T_{trans1}$. Similarly, as the first shape memory alloy is heated, the temperature at which the first shape memory alloy begins to change from the martensite phase to the austenite phase is known as the austenite start temperature, $A_s$. The temperature at which the first shape memory alloy completes the change from the martensite phase to the austenite phase is known as the austenite finish temperature, $A_f$, or first transformation temperature, $T_{trans1}$.

Therefore, the element 20 formed from the first shape memory alloy may be characterized by a cold state, i.e., when a temperature of the first shape memory alloy is below the martensite finish temperature, $M_f$, or first transformation temperature, $T_{trans1}$, of the first shape memory alloy. Likewise, the element 20 may also be characterized by a hot state, i.e., when the temperature of the first shape memory alloy is above the austenite finish temperature, $A_f$, or first transformation temperature, $T_{trans1}$, of the first shape memory alloy.

In operation, the first shape memory alloy that is pre-strained or subjected to tensile stress can change dimension upon changing crystallographic phase to thereby convert thermal energy to mechanical energy. That is, when exposed to the source of thermal energy, the first shape memory alloy can change dimension upon changing crystallographic phase to thereby convert thermal energy to mechanical energy. In particular, the first shape memory alloy may change crystallographic phase from martensite to austenite and thereby dimensionally contract at a localized region (represented generally at 44 in FIG. 2) so as to convert thermal energy to mechanical energy. More specifically, the first shape memory alloy may dimensionally contract if the first shape memory alloy has been previously pre-strained pseudoplastically. The terminology "pre-strained pseudoplastically" refers to stretching, e.g., straining, the element 20 under load while the first shape memory alloy is in the martensite phase. The shape of the first shape memory alloy under load does not fully recover when the element 20 is unloaded. In contrast, a shape of the element 20 when strained under purely elastic strain may fully recover. Therefore, upon unloading, the element 20 formed from the first shape memory alloy appears to have plastically deformed, but when the element 20 is heated to the austenite start temperature, $A_s$, the strained shape can be recovered so that the element 20 returns to an original length. That is, it is possible to load the first shape memory alloy such that an elastic strain limit of the first shape memory alloy is surpassed and deformation takes place in the martensitic crystal structure of the first shape memory alloy prior to exceeding a true plastic strain limit of the first shape memory alloy. Strain of this type, between the elastic strain limit and the true plastic strain limit, is pseudoplastic strain.

Therefore, the element 20 formed from the first shape memory alloy may be stretched before installation in the heat engine 18 such that the nominal length of the first shape memory alloy includes the recoverable pseudoplastic strain. Such recoverable pseudoplastic strain may provide motion for actuating and/or driving the heat engine 18. Therefore, without pre-stretching the first shape memory alloy, little deformation may occur during crystallographic phase change. Further, the element 20 may be subjected to a tensile force provided by a biasing mechanism, e.g., a spring or a tensioned austenitic section of the first shape memory alloy, to effect crystallographic phase change.

Conversely, the first shape memory alloy may change crystallographic phase from austenite to martensite to thereby dimensionally expand at the localized region 44 in response the heat sink 14. For example, when the first shape memory alloy is subjected to a tensile stress and the second temperature, $T_2$, the first shape memory alloy may dimensionally expand. The first shape memory alloy may thereby convert thermal energy to mechanical energy by alternately expanding and contracting. That is, the first shape memory alloy may alternately dimensionally contract at the localized region 44 in response to the heat source 12 and dimensionally expand at the localized region 44 in response to the heat sink 14 to thereby convert thermal energy to mechanical energy, as set forth in more detail below.

The first shape memory alloy may have any suitable composition. In particular, the first shape memory alloy may include in combination an element selected from the group of cobalt, nickel, titanium, indium, manganese, iron, palladium, zinc, copper, silver, gold, cadmium, tin, silicon, platinum, and gallium. For example, suitable first shape memory alloys may include nickel-titanium based alloys, nickel-aluminum based alloys, nickel-gallium based alloys, indium-titanium based alloys, indium-cadmium based alloys, nickel-cobalt-aluminum based alloys, nickel-manganese-gallium based alloys, copper based alloys (e.g., copper-zinc alloys, copper-aluminum alloys, copper-gold alloys, and copper-tin alloys), gold-cadmium based alloys, silver-cadmium based alloys, manganese-copper based alloys, iron-platinum based alloys, iron-palladium based alloys, and combinations of one or more of each of these combinations. The first shape memory alloy can be binary, ternary, or any higher order so long as the first shape memory alloy exhibits a shape memory effect, e.g., a change in shape orientation, damping capacity, and the like. The first shape memory alloy may be selected according to desired operating temperatures of the heat engine system 10, as set forth in more detail below. In one specific example, the first shape memory alloy may include nickel and titanium.

Further, the element 20 formed from the first shape memory alloy may have any suitable form, i.e., shape. For example, the element 20 may have a form of a shape-changing element. That is, the element 20 may have a form selected from the group of springs, tapes, wires, bands, continuous loops, and combinations thereof. Referring to FIG. 2, in one variation, the element 20 may be configured as a continuous loop spring.

The first shape memory alloy may convert thermal energy to mechanical energy via any suitable manner. For example, the element 20 formed from the first shape memory alloy may activate a pulley system (shown generally in FIG. 2 and set forth in more detail below), engage a lever (not shown), rotate a flywheel (not shown), engage a screw (not shown), and the like.

Figure 2:
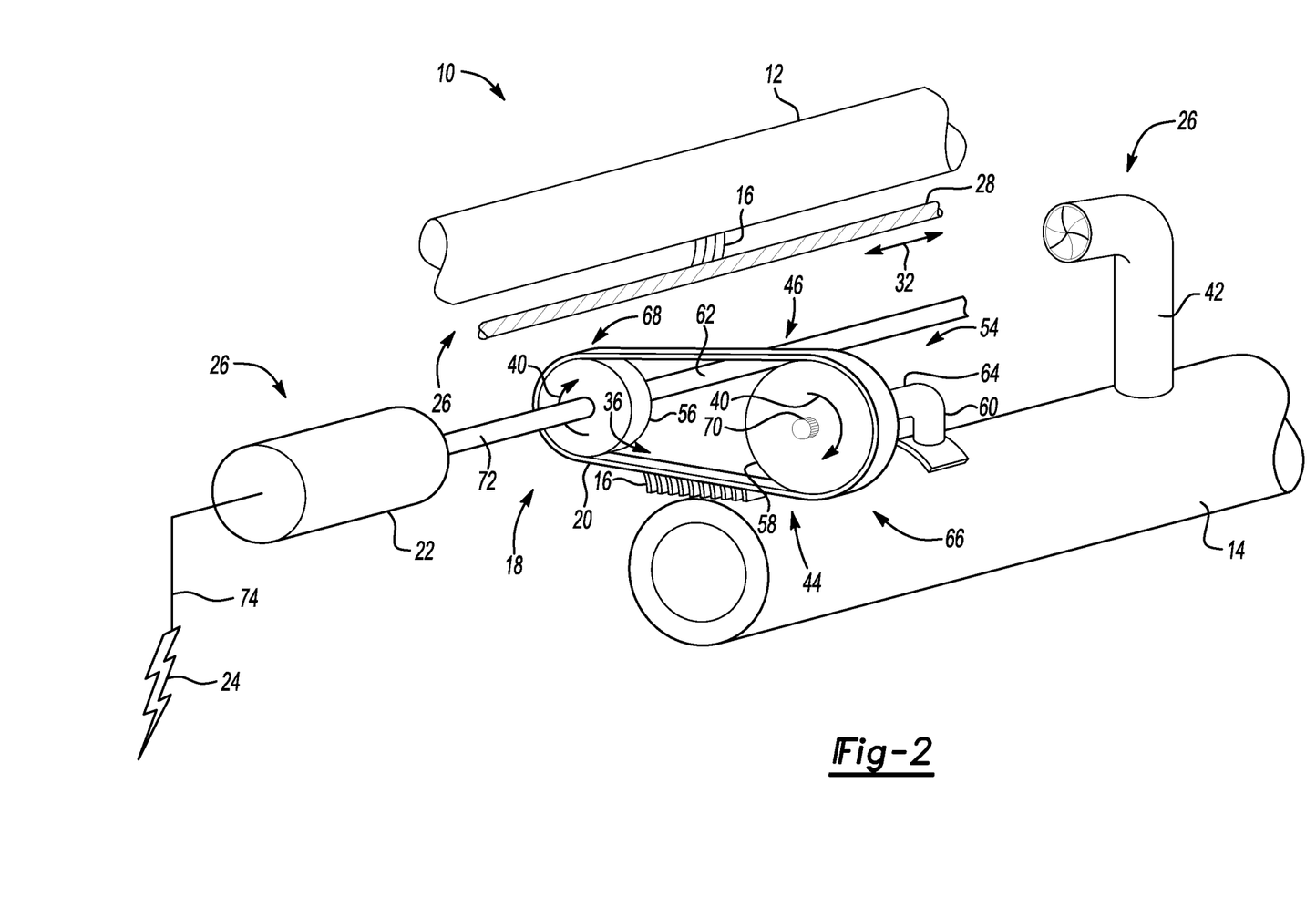
FIG. 2 is a schematic perspective view the heat engine of FIG. 1, a variation of the start-up mechanism of FIG. 1, and a generator for combination within the heat engine system of FIG. 1.

Referring again to the heat engine 18 of FIGS. 1 and 2, the heat engine 18 is disposed in thermal relationship, e.g., in heat exchange relationship, with the heat sink 14. For example, as shown in FIG. 2, the heat engine 18 may be disposed adjacent the heat sink 14 so that thermal energy may transfer from the heat engine 18 to the heat sink 14.

Referring again to FIG. 2, the heat engine system 10 may also include a generator 22 configured for converting mechanical energy to electricity (represented generally by symbol 24 in FIG. 2). The generator 22 may be any suitable device for converting mechanical energy to electricity 24. For example, the generator 22 may be an electrical generator that converts mechanical energy to electricity 24 using electromagnetic induction, and may include a rotor (not shown) that rotates with respect to a stator (not shown).

The generator 22 may be driven by the heat engine 18. That is, mechanical energy resulting from the conversion of thermal energy by the element 20 formed from the first shape memory alloy may drive the generator 22. More specifically, the aforementioned dimensional contraction and expansion of the first shape memory alloy may drive the generator 22. That is, the first shape memory alloy may alternately dimensionally contract at the localized region 44 in response to the first temperature, $T_1$, and dimensionally expand at the localized region 44 in response to the second temperature, $T_2$, to thereby convert thermal energy to mechanical energy and drive the generator 22, as set forth in more detail below.

Referring again to FIG. 1, the heat engine system 10 also includes a start-up mechanism 26 configured for inducing initial movement of the element 20 in a desired operational direction to thereby start the heat engine 18. That is, under certain conditions, e.g., after a period of non-use or momentary stall of the heat engine 18, the start-up mechanism 26 may impart energy to the heat engine 18 to start the heat engine 18. Stated differently, the start-up mechanism 26 may kick-start the heat engine 18 and induce movement in the desired operational direction. Therefore, the terminology "start-up" refers to any condition that follows non-operation of the heat engine 18. For example, start-up may occur after an extended period of non-use of the heat engine 18, or may occur after a momentary stall of the heat engine 18. The start-up mechanism 26 may therefore induce initial movement of the element 20 during a start or re-start of the heat engine 18. That is, especially when the heat engine 18 and/or element 20 have a symmetrical configuration, a "kick-start" may be required to ensure the heat engine system 10 operates in the desired operational direction. Likewise, since the heat engine 18 and/or element 20 may be configured to operate in only one direction, as set forth in more detail below, the start-up mechanism 26 may aid in regulating the temperature of the shape memory alloy. That is, since a stall of the heat engine 18 may cause the element 20 formed from the shape memory alloy to overheat, the start-up mechanism 26 may ensure ongoing movement of the element 20 during a stall of the heat engine 18.

In one non-limiting variation described with reference to FIG. 2, the start-up mechanism 26 includes an isolator 28 configured for isolating the element 20 from the heat source 12. That is, in operation, the isolator 28 may at least partially disrupt heat flow (shown by arrows 30 in FIG. 1) between the heat source 12 and the element 20. The isolator 28 may be any apparatus suitable for at least partially blocking the heat flow 30 (FIG. 1) from the heat source 12 to the element 20. For example, the isolator 28 may be an insulator configured for thermally insulating the element 20 from the heat source 12. As a non-limiting example, the insulator may be a ceramic shield that is configured for disrupting heat flow 30 (FIG. 1) from the heat source 12 to the heat sink 14.

Referring again to FIG. 1, the isolator 28 may be translatable with respect to the heat source 12. That is, the isolator 28 may slide in directions indicated by arrows 32 in FIG. 1 in a plane perpendicular to the heat flow 30 within the heat engine system 10 so as to block heat flow 30 to the element 20 formed from the first shape memory alloy. For example, the isolator 28 may be positionable between the element 20 and the heat source 12 to thereby block the element 20 from the heat source 12. Therefore, the isolator 28 may be suitably sized and shaped so as to be positioned and/or slide between the element 20 and the heat source 12.

With continued reference to FIG. 1, in operation, e.g., during shut-down of the heat engine system 10, the isolator 28 may translate into position between the element 20 and the heat source 12 so as to sufficiently isolate the element 20 from the heat source 12 so that the first shape memory alloy may not change crystallographic phase, as set forth in more detail below. Likewise, during start-up and/or after a stall of the heat engine 18, the isolator 28 may translate away from the element 20 so that the isolator 28 is not disposed between the heat source 12 and the element 20. In this position, at least partial heat flow 30 may therefore occur between the heat source 12 and the element 20.

Although not shown, in another variation, the element 20 may alternatively be translatable with respect to the heat source 12 to thereby expose the element 20 to the heat source 12. That is, the isolator 28 may be fixed and the element 20 may be moveable. For example, during start-up and/or after a stall of the heat engine 18, the heat engine 18 and/or the element 20 may translate at least partially away from the isolator 28 and into the heat flow 30. Similarly, during shut-down of the heat engine 18, the heat engine 18 and/or the element 20 may translate into position to be sufficiently isolated from the heat source 12 by the isolator 28 so that the first shape memory alloy does not change crystallographic phase.

Figure 3A:
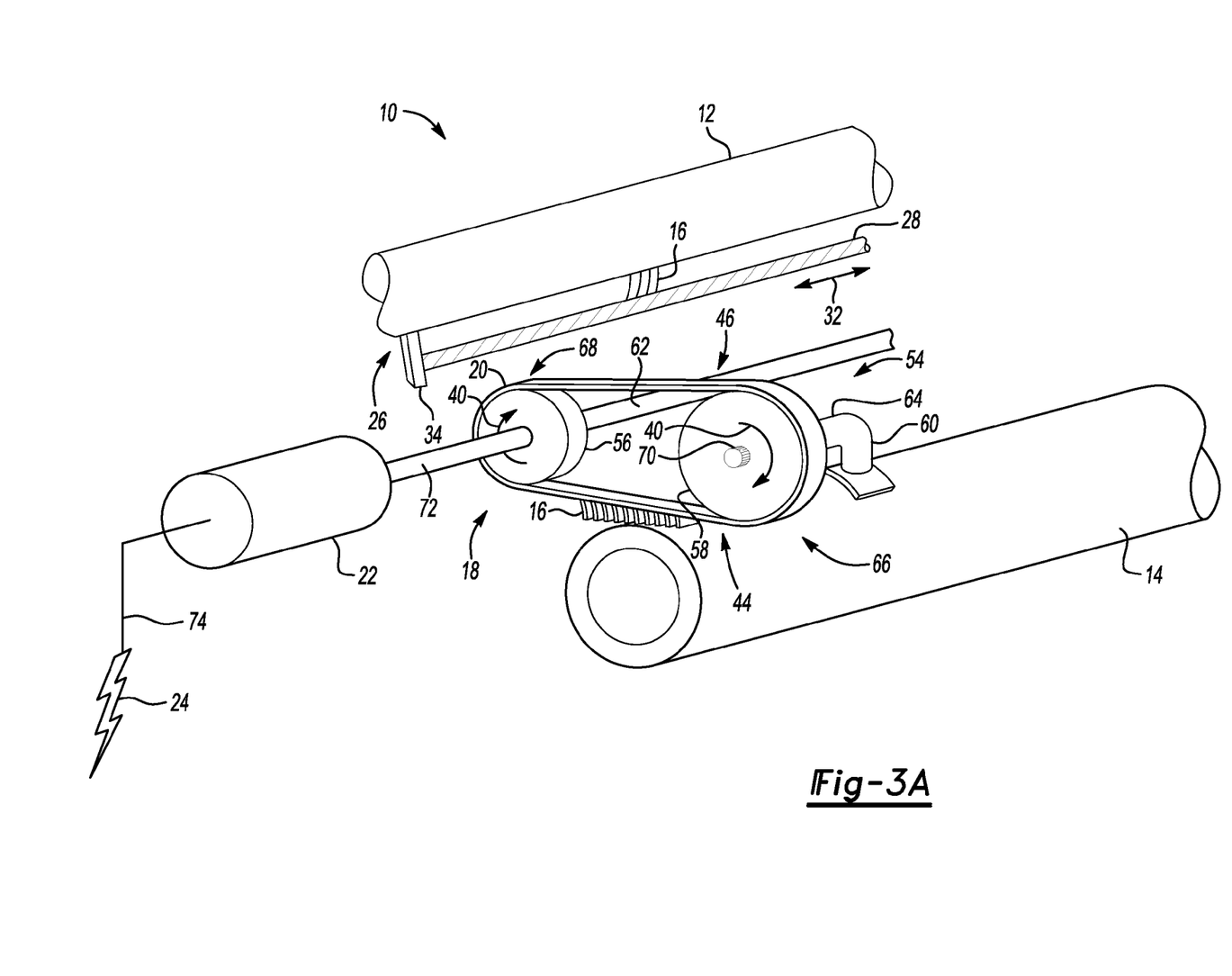
FIG. 3A is a schematic perspective view of another variation of the start-up mechanism of FIG. 1 including a latch.
Figure 3B:
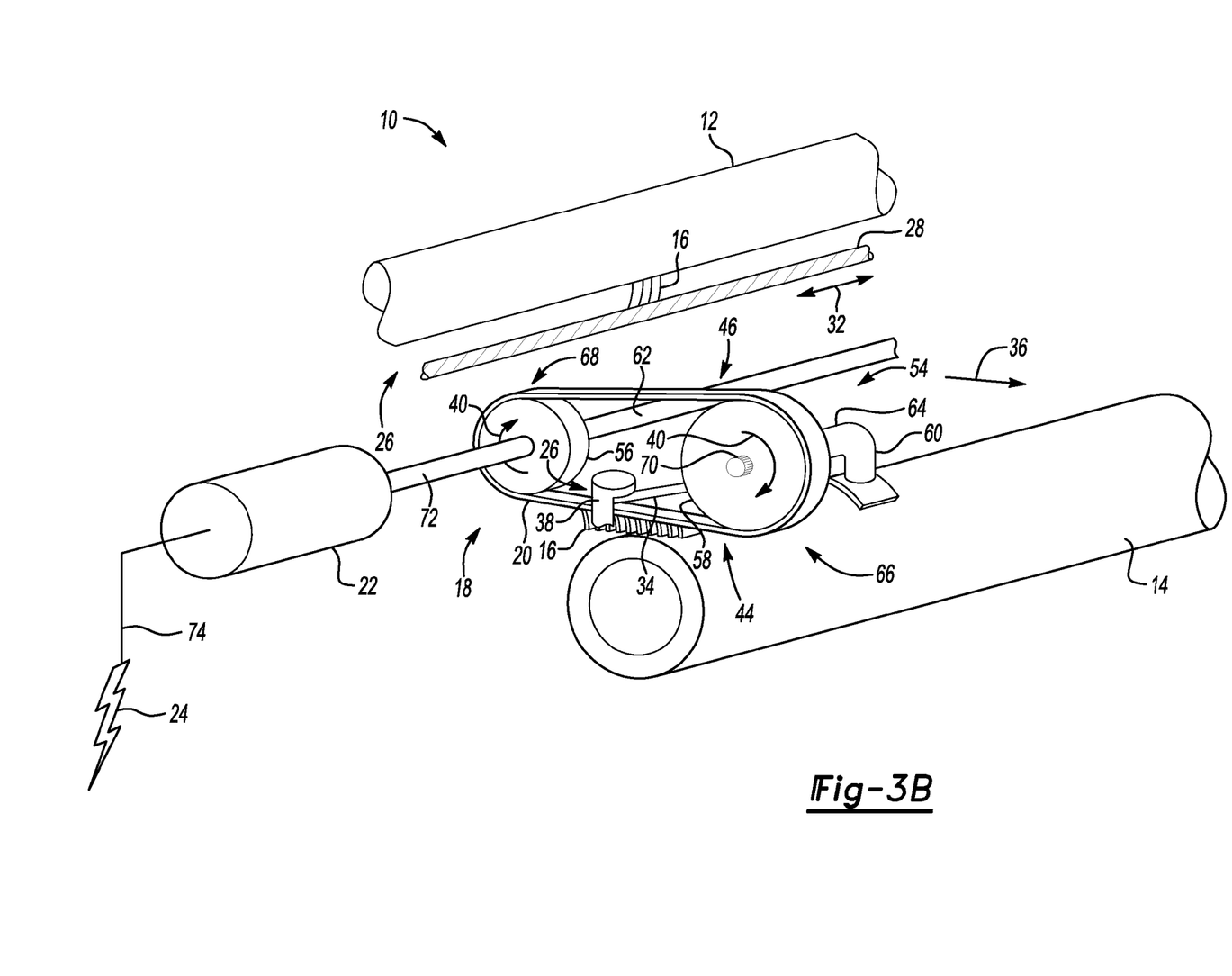
FIG. 3B is a schematic perspective view of another configuration of the start-up mechanism of FIG. 3A.

Referring now to FIGS. 3A and 3B, the start-up mechanism 26 may include a latch 34 configured for disposing the element 20 in insufficient thermal relationship with the heat source 12 for crystallographic phase change between austenite and martensite to occur. That is, the latch 34 may be configured for disposing the element 20 in insufficient thermal relationship with the heat source 12 so that the first shape memory alloy may not change crystallographic phase. For example, the latch 34 may include a rotating arm (not shown) that may rotate to engage and disengage.

In one variation shown in FIG. 3A, the latch 34 may retain the isolator 28 in a position so that heat flow (arrows 30 in FIG. 1) to the element 20 from the heat source 12 is disrupted. That is, when it is desired that the heat engine system 10 is non-operational, i.e., shut down, the latch 34 may retain or otherwise position the isolator 28 so that the element 20 is without sufficient thermal relationship with either the heat source 12 or the heat sink 14 for crystallographic phase change to occur. For example, as shown in FIG. 3A, the latch 34 may be configured for positioning the isolator 28 between the heat source 12 and the heat sink 14 so as to block heat flow 30 (FIG. 1) to the element 20. Conversely, when it is desired that the heat engine system 10 is operational, e.g., during start-up of the heat engine 18, the latch 34 may release the isolator 28 so that the isolator 28 may translate in the direction of arrows 32 so as to position the element 20 in sufficient thermal relationship with the heat source 12 for crystallographic phase change to occur.

Therefore, as shown in FIG. 3A, the start-up mechanism 26 may include a combination of the latch 34 and the isolator 28, e.g., the insulator set forth above. That is, in operation, the latch 34 may dispose the element 20 in insufficient thermal relationship with the heat source 12, e.g., in insufficient contact with the plurality of contacting objects 16, so that the first shape memory alloy does not change crystallographic phase, while the insulator also thermally insulates the element 20 from the heat source 12. By way of a non-limiting example, the contacting objects 16 may be flexible bristles that may effect conduction between the heat source 12 and the element 20. In another example, the plurality of contacting objects 16 may be rollers configured to interface with the element 20. Although not shown, the plurality of contacting objects 16 may also extend from the element 20 so that the element 20 includes a plurality of flexible bristles.

Referring again to FIG. 3A, for the variation of the heat engine system 10 including the plurality of heat-conducting contacting objects 16, the latch 34 may hold the element 20 sufficiently apart from the contacting objects 16 so as to disrupt conduction. Conversely, when it is desired that the heat engine system 10 is operational, the latch 34 may disengage. That is, the latch 34 may release or otherwise position the element 20 formed from the first shape memory alloy in sufficient thermal relationship, e.g., in contact, with each of the heat source 12 and the heat sink 14 so that the first shape memory alloy may change crystallographic phase.

In another variation shown in FIG. 3B, the latch 34 may retain the element 20 in insufficient thermal relationship with the heat source 12 so as to prevent movement, e.g., translation, of the element 20. That is, the latch 34 may hold the element 20 in a desired position so that movement, e.g., alternating dimensional expansion and contraction, of the first shape memory alloy may not occur. Upon release, the latch 34 may allow the element 20 to move in a direction indicated by arrows 36 in FIG. 3B, i.e., perpendicular to the heat flow 30 (FIG. 1) within the heat engine system 10.

Referring again to FIG. 3B, the start-up mechanism 26 may include a linkage 38 configured for urging the heat engine 18 in a desired operational direction when the latch 34 is disengaged. That is, the linkage 38 may "kick-start" the heat engine system 10 in the desired operational direction, e.g., clockwise. For example, the linkage 38 may include a cam, a rotating disc, a ramp, or combinations thereof. In one variation, the linkage 38 may move parallel to the desired operational direction of the heat engine 18 and may include an arm (not shown) that rotates to engage and disengage.

Heat engine systems 10 including the latch 34 may be useful for diesel engine exhaust system applications. In such applications, the latch 34 may retain the element 20 in insufficient thermal relationship for heat flow 30 (FIG. 1) to the element 20 from the heat source 12 and/or the heat sink 14 so that the first shape memory alloy may not change crystallographic phase until the heat source 12, e.g., the diesel engine exhaust gas, reaches a desired first temperature, $T_1$.

Referring again to FIG. 2, the start-up mechanism 26 of the heat engine system 10 may also include a clutch 40 configured for preventing operation of the heat engine 18 in a non-desired operational direction, e.g., counterclockwise or leftward. That is, the clutch 40 may include a ratcheting mechanism to allow the heat engine 18 to operate in only the desired operational direction. The clutch 40, therefore, may be characterized as "one-way" and may ensure that the heat engine system 10 is not "back driven".

With continued reference to FIG. 2, the start-up mechanism 26 may further include an apparatus 42 configured for directing fluid flow across the element 20 to thereby change a temperature of the element 20. For example, the apparatus 42 may lower a temperature of the element 20. In one non-limiting variation, the apparatus 42 may include air inlets or vanes oriented so that air external to the heat engine system 10 and/or relatively cooler exhaust gas may flow across the element 20 formed from the first shape memory alloy. Alternatively, the apparatus 42 may spray a cooled liquid onto the element 20. As the apparatus 42 lowers the temperature of the element 20, the element 20 may dimensionally expand and induce motion of the heat engine 18 in the desired operational direction. Therefore, heat flow 30 (FIG. 1) may be increased to one region, e.g., the localized region represented by arrow 44 in FIG. 2, as compared to another region, e.g., another localized region represented by arrow 46 in FIG. 2, by the vent flaps or vanes.

Conversely, the apparatus 42 may increase a temperature of the element 20. For example, air external to the heat engine system 10 and/or relatively warmer exhaust gas may flow across the element 20 formed from the first shape memory alloy. Alternatively, the apparatus 42 may spray a heated liquid onto the element 20. As the apparatus 42 increases the temperature of the element 20, the element 20 may dimensionally contract and induce motion of the heat engine 18 in the desired operational direction.

The apparatus 42 may alternatively or additionally direct fluid flow along the element 20 and thereby impart drag across the element 20, so as to cause motion of the element 20.

That is, fluid directed by the apparatus 42 may induce drag across the element 20, and induce motion of the heat engine 18 in the desired operational direction.

Figure 4:
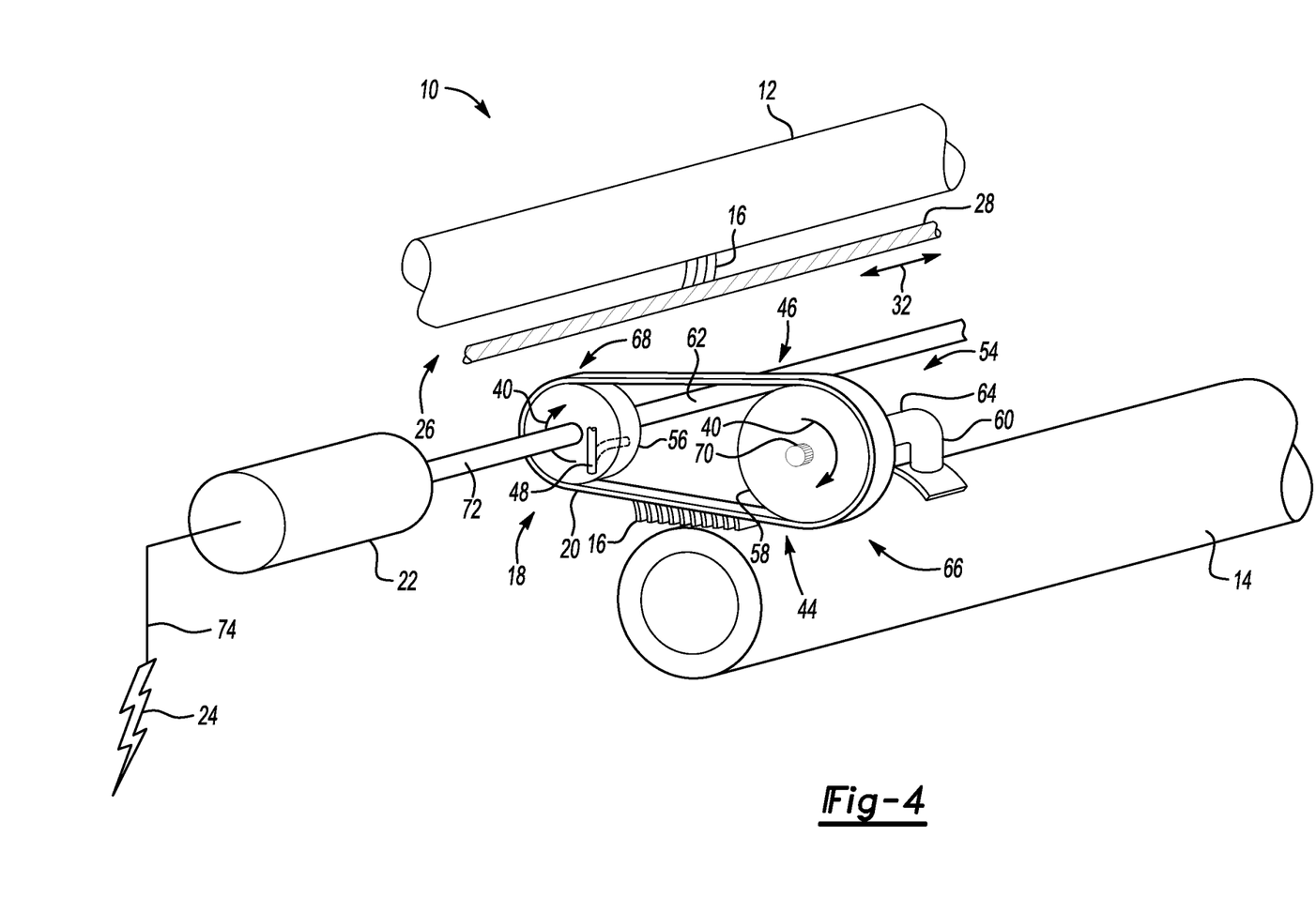
FIG. 4 is a schematic perspective view of yet another variation of the start-up mechanism of FIG. 1 including a thermally-activated member.

In another variation described with reference to FIG. 4, the start-up mechanism 26 may include a thermally-activated member 48 having a second transformation temperature, $T_{trans2}$, that is lower than the first transformation temperature, $T_{trans1}$. For example, the thermally-activated member 48 may be formed from a second shape memory alloy different from the first shape memory alloy set forth above. The second shape memory alloy may actuate at a different, e.g., lower, second transformation temperature, $T_{trans2}$, than the first shape memory alloy of the heat engine 18. Therefore, before the heat source 12 reaches the first temperature, $T_1$, the thermally-activated member 48 formed from the second shape memory alloy may impart initial motion to the heat engine 18 prior to the first shape memory alloy providing continuous operation of the heat engine 18.

By way of non-limiting examples, the thermally-activated member 48 may be formed from a bimetal strip or a wax actuator. For example, the thermally-activated member 48 may deform, melt, and/or expand in response to a second transformation temperature, $T_{trans2}$, and rub or urge the element 20 in a specified direction while deforming so as to kick-start the heat engine 18.

Figure 5:
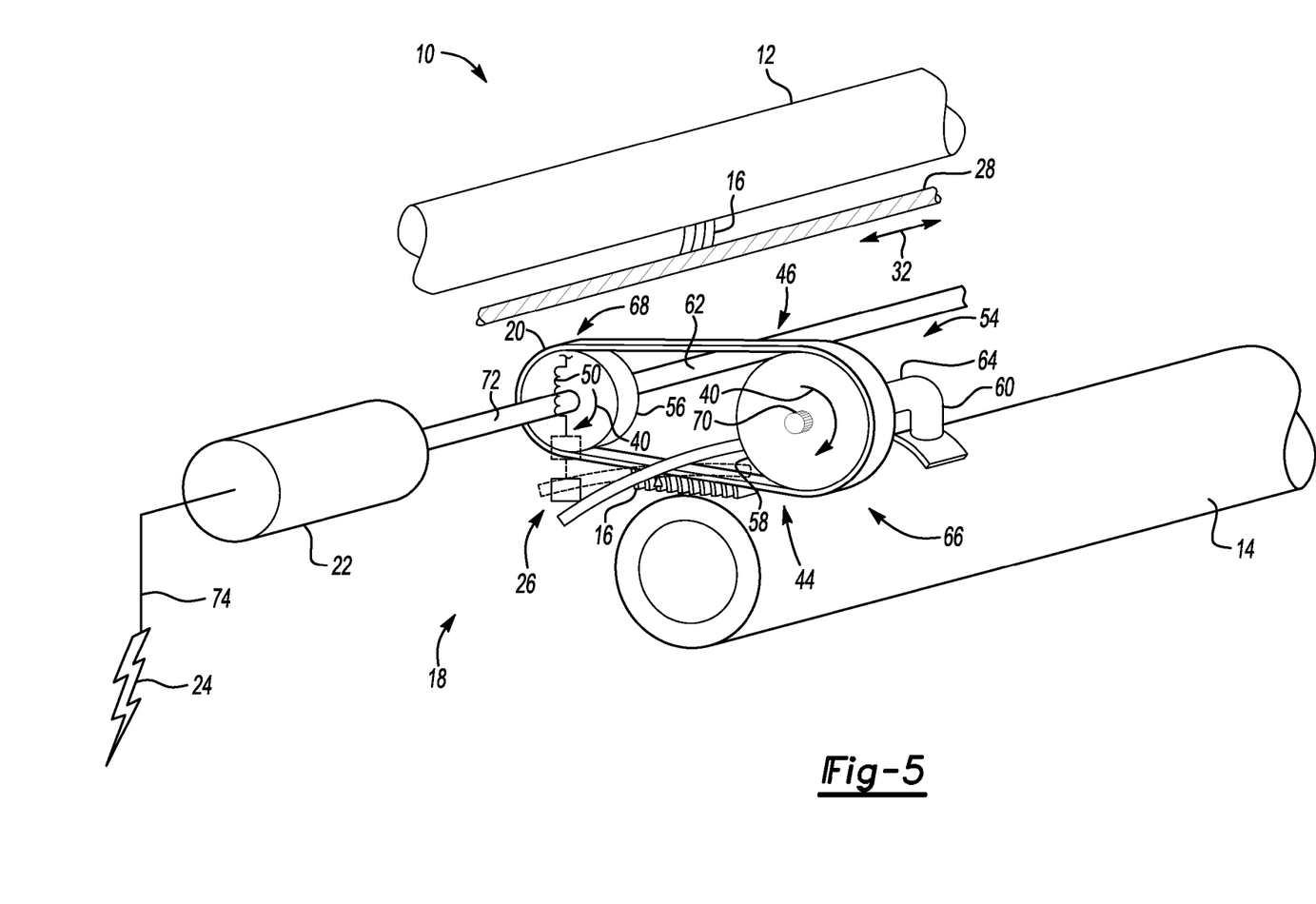
FIG. 5 is a schematic perspective view of a further variation of the start-up mechanism of FIG. 1 including a source of potential energy.

Referring now to FIG. 5, in another variation, the start-up mechanism 26 may be configured to impart kinetic energy to the heat engine 18. For example, the start-up mechanism 26 may be configured to release potential energy and impart kinetic energy to the heat engine 18. In this variation, the start-up mechanism 26 may include a potential energy source 50 such as a spring or a suspended mass. The start-up mechanism 26 may therefore be triggered to release potential energy stored by the spring or suspended mass and impart an initial, controlled kinetic energy to the heat engine 18. As a non-limiting example, the start-up mechanism 26 including the spring or suspended mass may act on a lever 52 to nudge the element 20 or pulley 58 in the desired operational direction.

Alternatively or additionally, the start-up mechanism 26 may include a kinetic energy source, such as, but not limited to, a source of vibrational energy. For example, for automotive applications, the kinetic energy source may be provided by vibration from, for example, a vehicle engine (not shown) or braking system (not shown). That is, the heat engine system 10 may be releasably connected to rigid structural members (not shown) of the vehicle, and kinetic energy may be imparted to the heat engine 18 by exposing the heat engine 18 to vehicle vibrations. After the heat engine 18 is vibrated or shaken sufficiently to induce initial movement of the element 20, the heat engine system 10 may be isolated or disconnected from the rigid structural members of the vehicle. The isolator 28 may also be configured to isolate the element 20 from the source of vibrational energy. Therefore, vibration may be used to initially urge the element 20 or pulley 58 in the desired operational direction. In another variation, the kinetic energy source may be provided by driving the generator 22 in reverse so that the generator 22 acts as a motor.

Further, it is to be appreciated that the start-up mechanism 26 may expose the heat engine 18 to multiple energy sources. For example, during non-standard operation, i.e., operation of a damaged heat engine 18 and/or operation during out-of-design conditions, the heat engine 18 may react to a vibrational energy source and the potential energy source 50 (FIG. 5). Further, the heat engine 18 may be exposed to energy sources in series or in parallel configuration. The heat engine 18 may be exposed to the energy sources for varying temporary durations. Moreover, the start-up mechanism 26 may be configured to interact with any component of the heat engine system 10. That is, the start-up mechanism 26 may contact or engage the element 20, and/or may contact or engage other structures of the heat engine system 10, such as pulleys 56, 58 as set forth in more detail below.

Referring again to FIG. 2, in one non-limiting example, the element 20 may be configured in a continuous loop (shown generally at 54 in FIG. 2). In this example, the heat engine 18 may include a plurality of pulleys 56, 58 or wheels configured for supporting the element 20. The heat engine 18 may also include a frame 60 configured for supporting the plurality of pulleys 56, 58 or wheels. For example, the plurality of pulleys 56, 58 or wheels may be disposed on a plurality of axles 62, 64, and may rotate with respect to the frame 60. The element 20 formed from the first shape memory alloy may be supported by, and travel along the wheels or pulleys 56, 58. That is, in this variation, the continuous loop 54 translates along the plurality of pulleys 56, 58.

As shown in FIG. 2, a first portion 66 of the continuous loop 54 may be longer than a second portion 68 of the continuous loop 54 whereby the heat engine 18 has an asymmetrical configuration. Therefore, initial movement of the element 20 may be induced by operating the heat engine 18 asymmetrically so that a change in length of the element 20 from dimensional expansion of the first portion 66 may not be equal to a change in length of the element 20 from dimensional contraction of the second portion 68.

With continued reference to FIG. 2, speed of rotation of the wheels or pulleys 56, 58 may optionally be modified by one or more gear sets 70. Moreover, the generator 22 may include a drive shaft 72 attached to the wheel or pulley 56. As the wheels or pulleys 56, 58 turn or rotate about the respective axles 62, 64 of the heat engine 18 in response to the dimensionally expanding and contracting element 20 formed from the first shape memory alloy, the drive shaft 72 may rotate and drive the generator 22. The generator 22 may then generate electricity 24 so that mechanical energy is converted to electricity 24.

Conversely, referring to FIG. 2, the generator 22 may drive the heat engine 18, e.g., during start-up. That is, as set forth above, the start-up mechanism 26 may include the generator 22 in this variation. The generator 22 may be operated as a motor, and may drive the drive shaft 72 attached to the wheel or pulley 56. The motor may rotate one or more of the wheels or pulleys 56, 58 so as to provide initial operation of the heat engine 18 in the desired operational direction. As the pulley 56 turns, the element 20 configured as the continuous loop 54 translates along the plurality of pulleys 56, 58 and thereby starts the heat engine 18. Therefore, in this example, the start-up mechanism 26 is configured for inducing initial movement of the element 20 in a desired operational direction to thereby translate the element 20 along the plurality of pulleys 56, 58 and start the heat engine 18.

As set forth above, for this variation, the start-up mechanism 26 may further include the clutch 40 configured for preventing operation of the heat engine 18 in the non-desired operational direction. That is, one or more pulleys 56, 58 may include a one-way clutch 40 to prevent rotation in the non-desired operational direction. Therefore, the continuous loop 54 may translate along the plurality of pulleys 56, 58 in only the desired operational direction. Alternatively or additionally, vibration may be used to rotate one or more of the wheels or pulleys 56, 58 so as to kick-start the heat engine 18.

In operation, and described with general reference to FIG. 2, the heat engine 18, and in particular, the element 20 formed from the first shape memory alloy, may be disposed in insufficient or sufficient thermal relationship with each of the heat source 12 and the heat sink 14 for crystallographic phase change to occur, as set forth above. That is, the element 20 may be disposed relative to each of the heat source 12 and the heat sink 14 so as to react to the first temperature, $T_1$, and/or the second temperature, $T_2$. For example, the element 20 of the heat engine 18 may be disposed in contact with the plurality of contacting objects 16 of the heat source 12 and the heat sink 14 so as to effect crystallographic phase change of the first shape memory alloy via conduction. Alternatively, the element 20 may be disposed in sufficient thermal relationship with a radiative coating on the heat source 12 and/or heat sink 14 so as to effect crystallographic phase change of the first shape memory alloy via radiation.

Therefore, the first shape memory alloy may change crystallographic phase between austenite and martensite when in thermal relationship with one of the heat source 12 and the heat sink 14. For example, when in thermal relationship with the heat source 12, the first shape memory alloy may change from martensite to austenite. Likewise, when in thermal relationship with the heat sink 14, the first shape memory alloy may change from austenite to martensite.

Further, the first shape memory alloy may change dimension upon changing crystallographic phase to thereby convert thermal energy to mechanical energy. More specifically, the first shape memory alloy may dimensionally contract upon changing crystallographic phase from martensite to austenite, e.g., if pseudoplastically pre-strained, and may dimensionally expand upon changing crystallographic phase from austenite to martensite to thereby convert thermal energy to mechanical energy. Therefore, for any condition wherein the temperature difference exists between the first temperature, $T_1$, of the heat source 12 and the second temperature, $T_2$, of the heat sink 14, i.e., wherein the heat source 12 and the heat sink 14 are not in thermal equilibrium, the first shape memory alloy may dimensionally expand and contract upon changing crystallographic phase between martensite and austenite. Further, the change in crystallographic phase of the first shape memory alloy may be sufficient to drive the generator 22.

With reference to the heat engine system 10 of FIG. 1 and described with respect to the example configuration of the element 20 shown in FIG. 2, during start-up and continuous operation of the heat engine system 10, one wheel or pulley 56 is in thermal relationship with, e.g., immersed in or in contact with, the heat source 12 while another wheel or pulley 58 is in thermal relationship with the heat sink 14 so as to effect crystallographic phase change of the first shape memory alloy. As the localized region (generally indicated by arrow 44) of the first shape memory alloy dimensionally expands, e.g., dimensionally stretches when under stress, when in thermal relationship with the heat sink 14, another localized region (generally indicated by arrow 46) of the first shape memory alloy in thermal relationship with the heat source 12 dimensionally contracts when previously pseudoplastically pre-strained. Alternating dimensional contraction and expansion of the continuous spring loop form of the element 20 upon exposure to the temperature difference, $\Delta T$, between the heat source 12 and the heat sink 14 may convert potential mechanical energy to kinetic mechanical energy, and thereby convert thermal energy to mechanical energy. Therefore, for optimal efficiency of the heat engine system 10, the heat source 12 and the heat sink 14 are desirably rapidly refreshed to maintain the temperature difference, $\Delta T$, between the heat source 12 and heat sink 14.

Referring again to FIG. 1, the heat engine 18 may be disposed in any location in the heat engine system 10 as long as portions of the element 20 are disposed in sufficient thermal relationship with a respective heat source 12 and heat sink 14 during operation so that the first shape memory alloy may change crystallographic phase in response to at least one of the heat source 12, the heat sink 14, and the temperature difference, $\Delta T$, between the heat source 12 and the heat sink 14. Also, although not shown, it is to be appreciated that the heat engine system 10 may include additional sensing and control components, e.g., an electronic control unit. The electronic control unit may be in operable communication with the heat engine system 10 and be configured for regulating conversion of thermal energy to mechanical energy and/or electricity 24 (FIG. 2). The electronic control unit may be, for example, a computer that electronically communicates with one or more controls and/or sensors of the heat engine system 10. For example, the electronic control unit may communicate with and/or control one or more of a temperature sensor of the heat source 12, a temperature sensor of the heat sink 14, a speed regulator of the generator 22, fluid flow sensors, actuators, and meters configured for monitoring electricity generation.

Further, as shown in FIG. 2, the heat engine system 10 may also include a transfer medium 74 configured for conveying electricity 24 from the heat engine system 10, e.g., from the generator 22. The transfer medium 74 may be, for example, a power line or an electrically-conductive cable. The transfer medium 74 may convey electricity 24 from the generator 22 to a storage device, e.g., a battery (not shown), an accumulator, and/or a collector. For example, the heat engine system 10 may generate, store, and/or convey electricity 24 according to fluctuations in demand.

It is also to be appreciated that for any of the aforementioned examples, variations, or configurations, the heat engine system 10 may include a plurality of heat engines 18, elements 20, and/or generators 22. That is, one heat engine system 10 may include more than one heat engine 18, element 20, and/or generator 22. For example, one heat engine 18 may drive more than one generator 22.

While the best modes for carrying out the disclosure have been described in detail, those familiar with the art to which this disclosure relates will recognize various alternative designs and embodiments for practicing the disclosure within the scope of the appended claims.

The invention claimed is:

1. A heat engine system configured for converting thermal energy to mechanical energy, the heat engine system comprising:

a source of thermal energy provided by a temperature difference between a heat source having a first temperature and a heat sink having a second temperature that is lower than said first temperature;

a heat engine disposed in thermal relationship with said heat sink and configured for converting thermal energy to mechanical energy, wherein said heat engine includes an element formed from a first shape memory alloy having a crystallographic phase changeable from martensite to austenite at a first transformation temperature to thereby dimensionally contract at a localized region in response to said heat source and from austenite to martensite to thereby dimensionally expand at another localized region in response to said heat sink, wherein said element is configured in a continuous loop; and a start-up mechanism configured for inducing initial movement of said element in a desired operational direction to thereby start said heat engine, wherein said start-up mechanism includes an isolator configured for isolating said element from said heat source, and further wherein said isolator is translatable with respect to said heat source to thereby expose said element to said heat source.

2. The heat engine system of claim 1, wherein said isolator is an insulator configured for thermally insulating said element from said heat source.

3. The heat engine system of claim 1, wherein said isolator is positionable between said element and said heat source to thereby block said element from said heat source.

4. A heat engine system configured for converting thermal energy to mechanical energy, the heat engine system comprising:
   a source of thermal energy provided by a temperature difference between a heat source having a first temperature and a heat sink having a second temperature that is lower than said first temperature;
   a heat engine disposed in thermal relationship with said heat sink and configured for converting thermal energy to mechanical energy, wherein said heat engine includes;
      an element formed from a first shape memory alloy having a crystallographic phase changeable from martensite to austenite at a first transformation temperature to thereby dimensionally contract in response to said heat source, and from austenite to martensite at the first transformation temperature to thereby dimensionally expand in response to said heat sink, wherein said element is configured in a continuous loop; and
      a plurality of pulleys configured for supporting said element, whereby said continuous loop translates along said plurality of pulleys; and
      a start-up mechanism configured for inducing initial movement of said element in a desired operational direction to thereby translate said element along said plurality of pulleys and start said heat engine, wherein said start-up mechanism includes an isolator configured for isolating said element from said heat source, and further wherein said isolator is translatable with respect to said heat source to thereby expose said element to said heat source.

5. The heat engine system of claim 4, wherein a first portion of said continuous loop is longer than a second portion of said continuous loop whereby said heat engine has an asymmetrical configuration.

6. The heat engine system of claim 4, wherein said continuous loop translates along said plurality of pulleys in only a desired operational direction.

7. The heat engine system of claim 4, wherein said first shape memory alloy alternately dimensionally contracts at said localized region in response to said heat source and dimensionally expands at said localized region in response to said heat sink to thereby convert thermal energy to mechanical energy.

* * * * *